Sept. 1, 1936.  H. S. WILSON ET AL  2,052,685

COIN CONTROLLED SELF SERVICE DEVICE

Filed March 18, 1936  2 Sheets-Sheet 1

INVENTORS
Henry S Wilson.
Henry Lauien
BY
ATTORNEY

Sept. 1, 1936.　　　H. S. WILSON ET AL　　　2,052,685
COIN CONTROLLED SELF SERVICE DEVICE
Filed March 18, 1936　　2 Sheets-Sheet 2

INVENTORS
Henry S. Wilson.
Henry Laufen
BY
ATTORNEY

Patented Sept. 1, 1936

2,052,685

UNITED STATES PATENT OFFICE 2,052,685

COIN CONTROLLED SELF SERVICE DEVICE

Henry S. Wilson, Brooklyn, and Henry Lauten, New York, N. Y.

Application March 18, 1936, Serial No. 69,472

9 Claims. (Cl. 194—65)

This invention relates to new and useful improvements in a coin controlled self-service device.

The invention has for an object the construction of a device as mentioned which is characterized by a tubular body, a front and a rear door hingedly mounted on the ends of said tubular body, and a novel method for controlling the opening of these doors and the serving of food from the tubular body.

More particularly, the invention contemplates the provision of a serving plate slidably mounted on the floor of the tubular body and arranged to extend forwards when the front door is open.

Still further the invention contemplates the provision of a novel linkage system between the serving plate and the doors which causes these parts to act in unison.

Still further the invention proposes the provision of a latch for holding the serving plate in a rearward position and thus hold the front door closed, and releasable by a coin operated mechanism.

Still further the invention proposes a mechanism for controlling the entrance of heat to said tubular member so that hot dishes may be served.

Another object of the invention is the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Figures 6, 7:
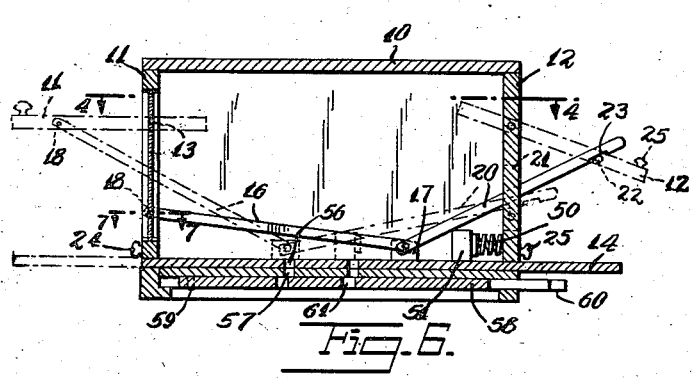
Fig. 6 is a longitudinal vertical sectional view taken on the line 6—6 of Fig. 4.
Fig. 7 is a fragmentary sectional view taken on the line 7—7 of Fig. 6.
Figure 4:
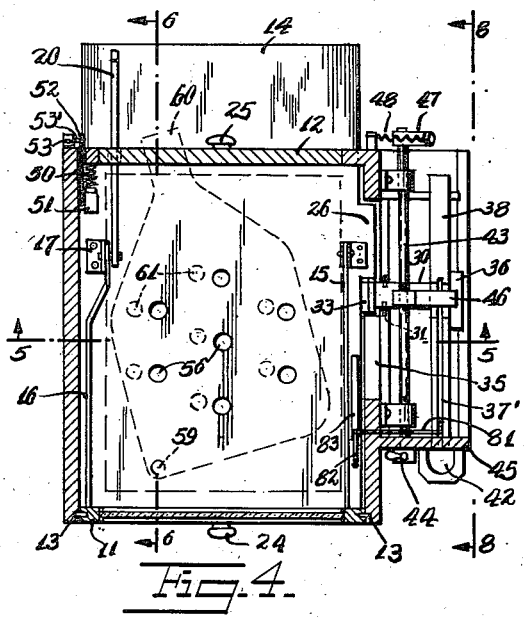
Fig. 4 is a horizontal sectional view taken on the line 4—4 of Fig. 6.

The self-service device, according to this invention, comprises a tubular member 10 consisting, essentially, of a rectangular shaped casing. A front door 11 is hingedly mounted upon the front end of the tubular body and is adapted to close this end. A rear door 12 is hingedly mounted on the rear end of the tubular body and serves to close this end. Each of these doors has a horizontal trunnion 13 near the top portion thereof by which the door is hingedly mounted. In Fig. 6 the dot and dash lines indicate the open positions of the doors.

A serving plate 14 is slidably mounted upon the floor of the tubular member 10. This serving plate is connected by a linkage system with the front door. The linkage system comprises a pair of links 15 and 16 pivotally mounted at their rear ends upon brackets 17 attached on the serving plate 14. At the front ends the links 15 and 16 have projecting pins 18 engaging into sockets in the sides of the doors (see Fig. 7). The arrangement is such that when the door 11 is hinged open the links 15 and 16 pull the serving plate 14 forwards and extend it, as indicated by the dot and dash lines in Fig. 6.

A link structure is also provided which serves to connect the serving plate and the rear door for moving the plate rearwards and closing the front door when the rear door is open. This link structure consists of a link 20 which is pivotally mounted at its front end on one of the brackets 17 and which extends through a slot 21 in the rear door 12. This slot is equipped with a small transverse pin 22. The outer end of the link 20 is formed with a hook shaped cutout 23 adapted to be engaged by the pin 22. The arrangement is such that the door 12 may be forced open, and during this action, the bottom edge of the link merely rests against the pin 22. When the door has been opened a sufficient amount so that the pin 22 engages in the cutout 23, upon further opening of the door 12 the slide 14 will be pulled rearward, and in turn the links 15 and 16 will pull the front door 11 closed.

Figures 1, 3:
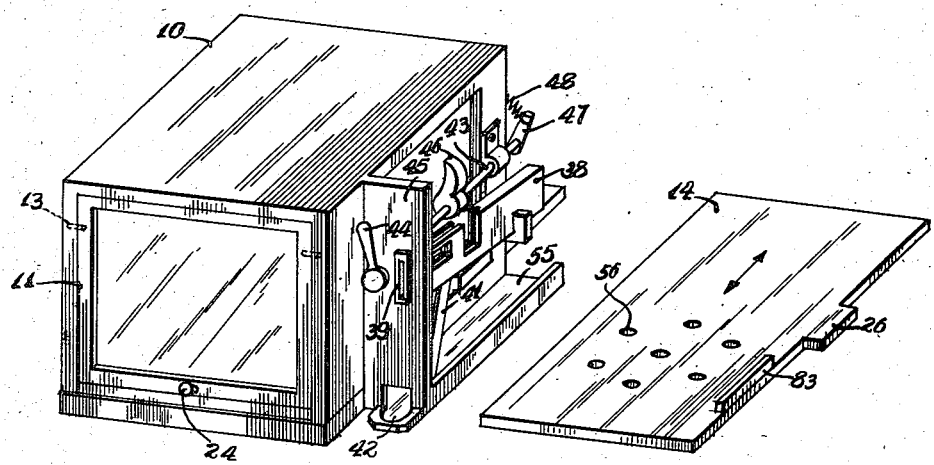
Fig. 1 is a perspective view of a coin controlled self-service device constructed according to this invention.
Fig. 3 is a perspective view of the serving plate per se.
Figure 2:
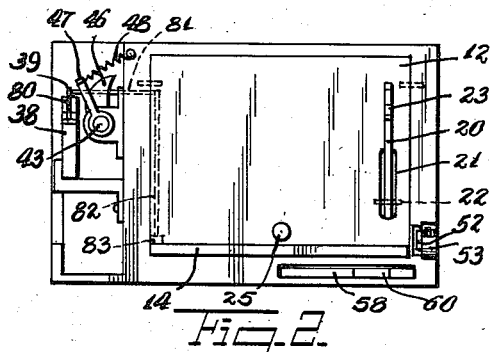
Fig. 2 is a side elevational view of Fig. 1.

The front door 11 is provided with a handle 24 by which it may be conveniently manipulated. The rear door is provided with a handle 25. A latch is provided for holding the serving plate 14 in its rearward position. This latch comprises a side projection 26 on one edge of the serving plate 14 (see Fig. 3) engageable by the lower end 30' of a lever 30 which is pivotally supported intermediate of its ends by a trunnion 31. This lever extends through an opening 32 in the side wall of the tubular member 10. A weight 33 is attached upon the inner end 30' of the lever and serves to normally urge the lever into its latching position. The side wall of the tubular member 10 is formed with a slot 35 into which the projection 26 engages. The ends of this slot limit the amount to which the serving plate may be extended or retracted.

Figure 8:
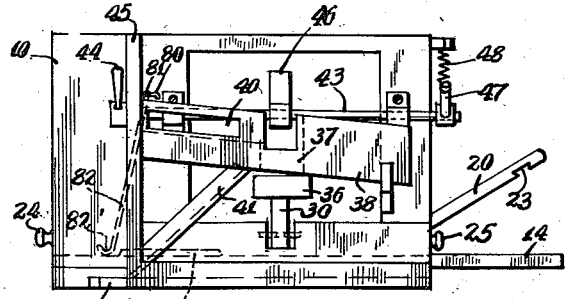
Fig. 8 is a side elevational view looking in the direction of the line 8—8 of Fig. 4.

The outer end of the lever 30 is provided with a headpiece 36 which is located immediately below the exit end of a coin slot 37. This coin slot is arranged in a bar 38 supported by several brackets on the side of the tubular member 10. The bar 38 is disposed at an inclination, as clearly shown in Fig. 8, so that a coin may roll down. The front end of the bar connects with a coin opening 39 (see Fig. 1). The bar has the coin slot 37' cut into the top edge thereof and extending to the discharging point 37. The sides of the bar 38 are formed with cutouts 40 so that a smaller sized coin cannot possibly reach the coin discharge 37. For example, if the coin device is designed to take a five cent piece, if a ten cent piece is placed into the opening 39 it cannot possibly roll down the bar 38 and reach the discharge 37 since before it reaches this point it will fall either towards one side or the other, out through the opening 40. The right sized coin is large enough to be supported by the material at the top of the opening. When the smaller sized coin falls from the bar 38 it will drop into a chute 41 which is designed to receive it. This chute is inclined and discharges into a return coin element 42 arranged below the coin opening 39. In this manner a person's coin is returned.

Figure 5:
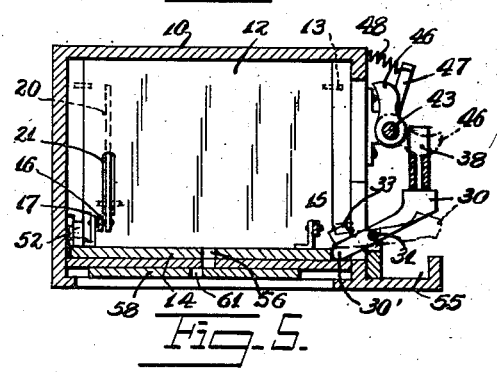
Fig. 5 is a transverse vertical sectional view taken on the line 5—5 of Fig. 4.

In the event that the coin is of the proper size it will reach the discharge opening 37 and rest against the head 36 of the pivoted lever 30. A shaft 43 is rotatively supported by several bearings on the side of the tubular body 10 and has a handle 44 provided at one end. This handle is disposed immediately adjacent the coin slot 39 and outside of a small partition 45 attached on the side of the tubular body 10. A cam 46 is attached on the shaft 43 and is disposed immediately over the discharge 37 and is capable of forcing the coin downwards so as to press the lever 30. A radial arm 47 is attached to the shaft 43 and is connected with the spring 48 which is attached to the sides of the tubular body 10. This spring normally returns the shaft 43 to its original position. After a coin has been deposited the handle 44 must be manually turned to depress the coin and pivot the lever 30. The dot and dash lines in Fig. 5 show the lowered position of the cam 46 and the pivoted position of the lever 30.

A means is provided for moving the serving plate 14 slightly forwards so as to prevent the end 30' of the lever from re-locking the serving plate, except if the serving plate is retracted. This resilient means comprises a spring 50 which acts between the tubular body 10 and a block 51 on the serving plate 14. A link 52 is pivotally connected with the block 51 and is adapted to strike the operating lever 53' of a counter 53 which is mounted on the back of the tubular body 10. This counter is adapted to count the number of times that the serving plate 14 is released by the insertion of a coin.

When the cam 46 reaches the lower position, the coin will fall out and discharge into the trough 55 which is disposed behind the inclined chute 41. As this trough opens at the back of the device the coin may be removed whenever desired.

A provision is made for controlling the entrance of heat to the tubular body. This provision consists of several openings 56 formed in the serving plate 14 and alignable in the normally retracted position of the serving plate with corresponding openings 57 formed in the floor wall of the tubular member 10. These openings 57 are controlled by a damper plate 58. This damper plate is pivotally supported by a pin 59 and has a projecting end 60 extending to the rear of the device by which the operator may move it. This damper plate 58 is provided with openings 61 which may be completely or partially aligned with the openings 57 by the proper shifting of the plate, possible by moving the handle 60.

A mechanism is also provided for preventing a coin from being inserted into the coin slot 39 when the doors are open. This mechanism consists of a finger 80 superimposed above the coin slot 37' behind the coin opening 39, and fixed upon a spindle 81 which extends through the side wall of the tubular body 10. Upon the inner end of this spindle 81 there is a depending arm 82 which extends downwards and has a curved bottom end 82'. This arm is in the path of motion of a cam 83 which projects from the serving plate 14. When the serving plate 14 is even only slightly moved forward the cam 83 will have engaged beneath the arm 82 and pivoted the arm so that the finger 80 is turned into the coin slot 37'. Thus, the finger will prevent a coin from being fully engaged into the coin opening 39.

Figure 9:
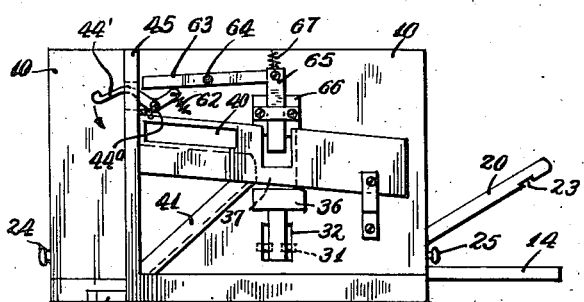
Fig. 9 is a view similar to Fig. 8 but illustrating a modified form of the invention.

In Fig. 9 a modified form of the invention is disclosed which is substantially identical to the previous form, except as to the coin device. According to this form, there is a pivotally mounted handle 44' which extends through an opening in the partition 45. This handle 44' is pivoted at the point 44ª and is normally urged into a neutral position by a spring 62. The rear end of the handle is adapted to engage one end of the lever 63 which is pivoted at 64 so that the other end of the lever engages a plunger 65. This plunger is slidably supported in a standard 66 and is held in a raised position by a spring 67. When the outer end of the handle 44' is depressed the inner end is raised, which will pivot the bar 63, which causes the plunger 65 to move downwards. This plunger is adapted to force a coin which is resting upon the head 36 of the lever 30 downwards, and so operate the device.

Figure 10:
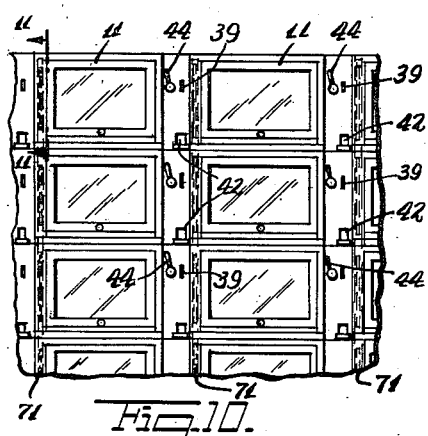
Fig. 10 is a fragmentary front elevational view of a plurality of coin controlled self-service devices constructed according to a modification of the invention.
Figure 11:
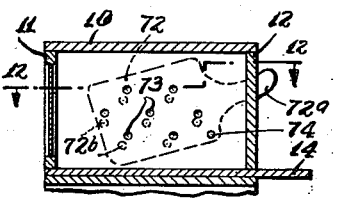
Fig. 11 is a fragmentary sectional view taken on the line 11—11 of Fig. 10.
Figure 12:
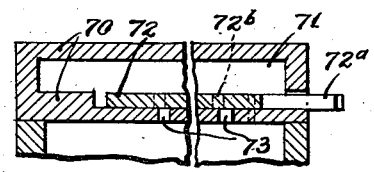
Fig. 12 is a fragmentary enlarged horizontal sectional view taken on the line 12—12 of Fig. 11.

In Figs. 10-12 inclusive another form of the invention is disclosed in which the heat is adapted to enter through the side of the tubular body instead of through the bottom. With this arrangement the service devices may be built one above the other. In Fig. 10 a plurality of service devices are shown in their stacked positions. In each of these devices there is a double side wall 70 forming an interior passage 71. This passage is connectible to the interior of the tubular body by a control damper 72. This damper has an extended end 72ª. It is also formed with a plurality of openings 72ᵇ which are adapted to align partially or fully with similar openings 73 in the inner wall of said damper wall. A pin 74 is utilized to pivotally support the damper plate 72. Hot air may be supplied to the compartments 71 and the dampers used to control the amount of the hot air which reaches the interior of the various tubular bodies.

The operation of the device is as follows:— When a coin of the correct size is deposited in the slot 39 it will roll down the groove 37' in the top edge of the bar 38 and drop into the groove opening 37. The handle 44 in the form of the invention shown in Figs. 1–8, or the handle 44' in the form of the invention shown in Fig. 9, is operated to cause the coin to be pressed downwards. This will pivot the lever 30 which then moves so that its inner end 39' moves upwards and out of contact with the projections 26 of the serving plate 14. The serving plate is then moved slightly forwards by the spring 50. Then, at one's leisure the front door 11 may be hinged open. As the door 11 is moved upwards the serving plate 14 will move forwards to the dot and dash position shown in Fig. 6. It is thus convenient to extract the food or other material thereon.

When the rear door 12 is open the pin 22 will engage the openings 23 of the link 20 and move the serving plate 14 rearwards. This causes the front door to close. It also permits the lever 30 to pivot back to its original position so that the end 30' engages the projection 26 and the front door is now locked.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention what we claim as new and desire to secure by United States Letters Patent is:—

1. A self-service device, comprising a tubular body, a front and rear door hingedly mounted on the ends of said tubular body for closing the same, a serving plate slidably mounted on the floor of said tubular body, links connecting said serving plate and said front door for moving said plate forwards when the door is opened, a link structure connecting said serving plate and rear door for moving the plate rearwards and closing the front door when the rear door is opened, a latch holding said plate in a rearward position, and a coin controlled means adapted to release said latch to allow said front door to be opened.

2. A self-service device, comprising a tubular body, a front and rear door hingedly mounted on the ends of said tubular body for closing the same, a serving plate slidably mounted on the floor of said tubular body, links connecting said serving plate and said front door for moving said plate forwards when the door is opened, a link structure connecting said serving plate and rear door for moving the plate rearwards and closing the front door when the rear door is opened, and a latch holding said plate in a rearward position, a coin controlled means adapted to release said latch to allow said front door to be opened, said links being pivotally connected at one of their ends with the serving plate, and at their other ends with said front door.

3. A self-service device, comprising a tubular body, a front and rear door hingedly mounted on the ends of said tubular body for closing the same, a serving plate slidably mounted on the floor of said tubular body, links connecting said serving plate and said front door for moving said plate forwards when the door is opened, a link structure connecting said serving plate and rear door for moving the plate rearwards and closing the front door when the rear door is opened, and a latch holding said plate in a rearward position, a coin controlled means adapted to release said latch to allow said front door to be opened, said link structure being pivotally connected with said serving plate and engaging through an opening in said rear door.

4. A self-service device, comprising a tubular body, a front and rear door hingedly mounted on the ends of said tubular body for closing the same, a serving plate slidably mounted on the floor of said tubular body, links connecting said serving plate and said front door for moving said plate forwards when the door is opened, a link structure connecting said serving plate and rear door for moving the plate rearwards and closing the front door when the rear door is opened, and a latch holding said plate in a rearward position, a coin controlled means adapted to release said latch to allow said front door to be opened, said link structure being pivotally connected with said serving plate and engaging through an opening in said rear door, a pin within said opening and adapted to support the link along its bottom edge, said link being formed with a cutout near its outer end into which the pin may engage for moving the link as the rear door is fully opened.

5. A self-service device, comprising a tubular body, a front and rear door hingedly mounted on the ends of said tubular body for closing the same, a serving plate slidably mounted on the floor of said tubular body, links connecting said serving plate and said front door for moving said plate forwards when the door is opened, a link structure connecting said serving plate and rear door for moving the plate rearwards and closing the front door when the rear door is opened, and a latch holding said plate in a rearward position, a coin controlled means adapted to release said latch to allow said front door to be opened, comprising a pivotally mounted lever the inner end of which is adapted to engage in front of a projection on the side of said serving plate.

6. A self-service device, comprising a tubular body, a front and rear door hingedly mounted on the ends of said tubular body for closing the same, a serving plate slidably mounted on the floor of said tubular body, links connecting said serving plate and said front door for moving said plate forwards when the door is opened, a link structure connecting said serving plate and rear door for moving the plate rearwards and closing the front door when the rear door is opened, a latch holding said plate in a rearward position, and a coin control device for opening said latch.

7. A self-service device, comprising a tubular body, a front and rear door hingedly mounted on the ends of said tubular body for closing the same, a serving plate slidably mounted on the floor of said tubular body, links connecting said serving plate and said front door for moving said plate forwards when the door is opened, a link structure connecting said serving plate and rear door for moving the plate rearwards and closing the front door when the rear door is opened, a latch holding said plate in a rearward position, and a coin control device for opening said latch, comprising a grooved bar aligned with a coin opening and arranged at an inclination, and a manually operative element for pressing a coin from said coin device downwards to release said latch.

8. A self-service device, comprising a tubular body, a front and rear door hingedly mounted on the ends of said tubular body for closing the same, a serving plate slidably mounted on the floor of said tubular body, links connecting said serving plate and said front door for moving said plate forward when the front door is opened, a link structure connecting said serving plate and rear door for moving the plate rearwards and closing the front door when the rear door is opened, a latch for holding said plate in a rearward position, a coin controlled device for opening said latch, and a means for slightly ejecting said serving plate so as to prevent said latch from re-locking the serving plate before the food has been removed.

9. A self-service device, comprising a tubular body, a front and rear door hingedly mounted on the ends of said tubular body for closing the same, a serving plate slidably mounted on the floor of said tubular body, links connecting said serving plate and said front door for moving said plate forward when the front door is opened, a link structure connecting said serving plate and rear door for moving the plate rearwards and closing the front door when the rear door is opened, a latch for holding said plate in rearward position, a coin controlled device for opening said latch, and a means for slightly ejecting said serving plate so as to prevent said latch from re-locking the serving plate before the food has been removed, comprising a block fixedly mounted on said serving plate, a spring acting between said tubular body and said block to slightly eject said plate.

HENRY S. WILSON.
HENRY LAUTEN.